Patented Oct. 31, 1950

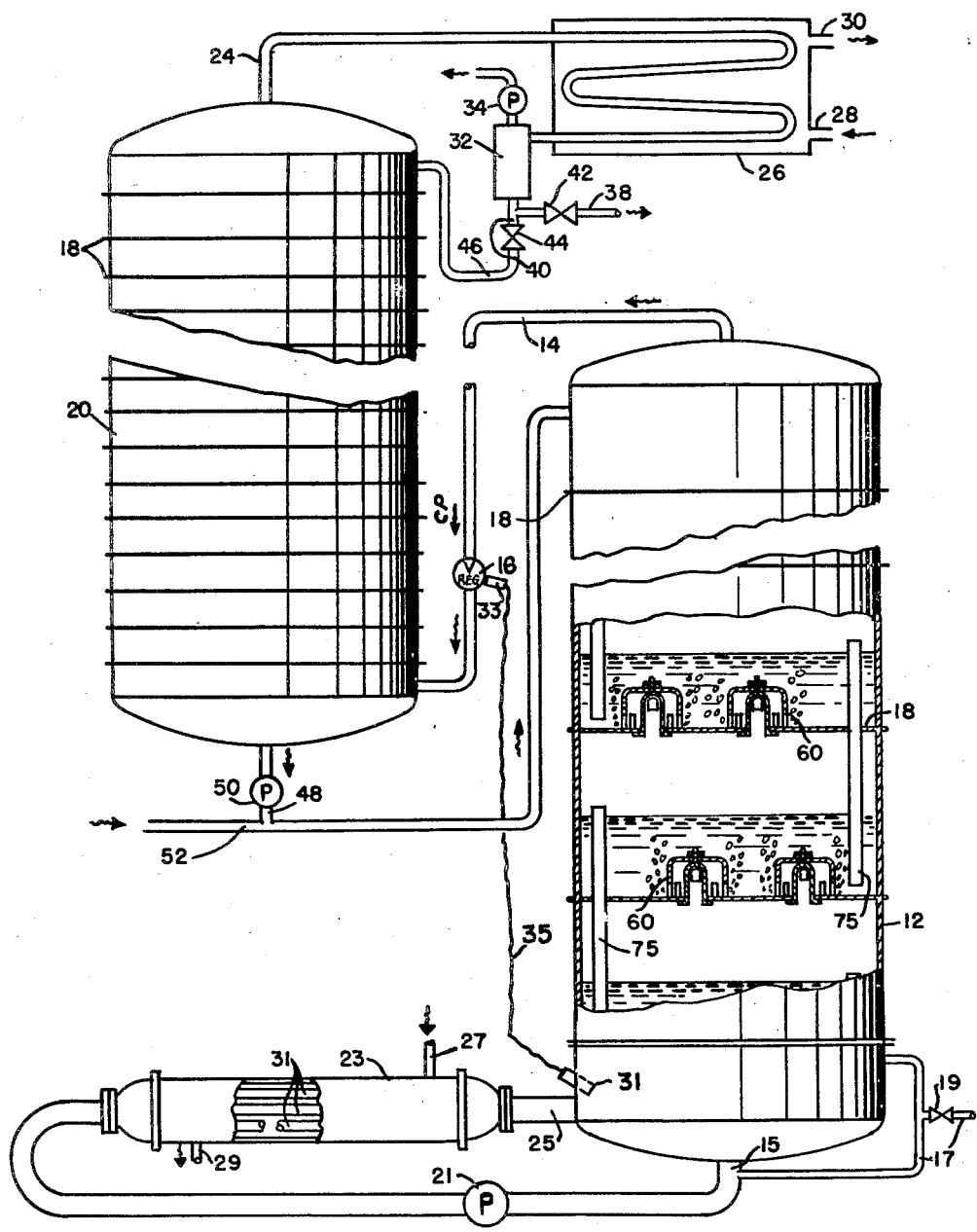

2,527,655

UNITED STATES PATENT OFFICE 2,527,655

CONCENTRATION OF FORMALDEHYDE

Cyrus Pyle, New Castle, Del., and James A. Lane, Oak Ridge, Tenn., assignors to E. I. du Pont de Nemours & Company, Wilmington, Del., a corporation of Delaware Application June 3, 1948, Serial No. 30,758

7 Claims. (Cl. 202—40)

This invention relates to the concentration of aqueous solutions of formaldehyde.

In our copending application, Serial No. 730,634, filed February 24, 1947, we described in particular detail a process for the concentration of formaldehyde in which an aqueous solution of formaldehyde was fractionated in a fractionating column while maintaining a pressure differential of at least 200 mm. Hg through the column, a highly concentrated formalddehyde product, i. e., chiefly polymerized formaldehyde, being withdrawn at the bottom of the column, and water vapors or a mixture of water and formaldehyde vapors being withdrawn at the top of the column. As stated in the above-said application, the pressure differential could be provided in any manner, for example, by constructing the chimney or vapor outlet openings in the plates of restricted number or by restricting the free areas of such openings whereby to restrict the flow of vapors so as to build up the desired flow resistance, or, preferably, by maintaining an extraordinarily large head of liquid on each plate.

The above-said application also discloses that if a mixture of water and formaldehyde vapors containing a material amount of formaldehyde are withdrawn from the top of the column, the formaldehyde could be concentrated by passing the same through a pressure distilling unit from which substantially formaldehyde-free water is withdrawn from the bottom, and a mixture of water and formaldehyde vapors containing a substantial proportion of formaldehyde is withdrawn from the top. The top product from this auxiliary column is condensed and fed back into the main fractionating column.

The process of the above-identified application has resulted in greatly advancing the art of concentrating aqueous solutions of formaldehyde. This process, however, is subject to one or two alternative short-comings in cases where it is desirable to concentrate substantially all of the formaldehyde of an aqueous solution thereof in the form of a concentrated formaldehyde product containing 70% to 97% formaldehyde.

If the above-said process is operated in conjunction with a pressure distilling unit whereby the formaldehyde is recovered from the vapors passing from the fractionating column through which a pressure differential is maintained, any methanol contained in the formaldehyde feed solution is unavoidably concentrated in the system to the point where it interferes with formaldehyde concentration. Such a system is also subject to formation of formic acid in the product. Formaldehyde is usually manufactured by the catalytic oxidation of methanol and the formaldehyde-containing gases absorbed in water to produce aqueous solutions of formaldehyde. Such solutions contain substantial amounts of methanol which will be concentrated in the system as above-described.

If, on the other hand, the above-said process is operated without the employment of a pressure distilling unit, a fractionating column having only provision for plate to plate pressure drop cannot be constructed with an economical and practical design to produce paraformaldehyde at the bottom of the column and substantially formaldehyde-free (less than 1%) water at the top of the column.

It is, therefore, an object of this invention to provide an improved process for the concentration of formaldehyde by fractionation.

It is another object of this invention to provide a process for the concentration of formaldehyde by fractionation in which substantially all of the formaldehyde of an aqueous solution of formaldehyde may be economically concentrated to a formaldehyde product containing 70% to 97% formaldehyde without objectionable formation of formic acid or concentration of methanol contained in the formaldehyde solution.

Other objects of the invention will appear hereinafter.

The objects of this invention may be accomplished, in general, by fractionating an aqueous solution of formaldehyde in a fractionating system having two connected fractionating sections operating with a pressure drop from one section to the other section of at least 100 mm. Hg, the liquid effluent from the bottom of the lower pressure section passing into the higher pressure section, and the vaporous effluent of the higher pressure section passing into the lower pressure section. The concentration of formaldehyde in the aqueous solution of formaldehyde fed into the fractionating system is higher than the concentration of the formaldehyde in the vapors passing from the fractionating system.

At the outset, it may be well to point out that, in the vapor phase, formaldehyde and water are present as an uncombined mixture of formaldehyde and water vapors, whereas, in the liquid phase, at the same formaldehyde concentration, the formaldehyde is present in the hydrated form, with or without the presence of free water dependent upon the formaldehyde concentration. At low concentrations of formaldehyde, the latter will be present mainly as methylene glycol in admixture with free water. At higher concentrations, there will be present increasing amounts of formaldehyde polymer hydrates, the molecular weight of the hydrated polymers increasing in accordance with increase in formaldehyde concentration. In other words, in aqueous solutions of formaldehyde, as the concentration therein of the formaldehyde increases, the solutions will contain methylene glycol, $HO \cdot CH_2 \cdot OH$, and increasing amounts of higher polyoxymethylene glycols, $HO \cdot (CH_2O)_n \cdot H$, the higher the concentration the greater the numeral $n$. It is, therefore, to be understood that when equilibrium exists between formaldehyde-water mixtures in the vapor state and formaldehyde in water solution, equivalent percentage concentrations of formaldehyde will exist in both phases, regardless of the many hydrated and polymeric forms in which the formaldehyde may exist when it is dissolved in water.

The invention will be more readily understood by reference to the following description taken in connection with the accompanying diagrammatic illustration showing one embodiment of a fractionating system constructed to carry out the process of the invention.

In the illustration, reference numeral 12 designates one section of a fractionating system composed of two sections. Section 12 will hereinafter be referred to as the higher pressure section. Numeral 20 designates the other section, i. e., the lower pressure section, of the two-section fractionating system. The top of the higher pressure section 12 is connected by means of conduit 14 and a constant pressure regulating valve 16 to the bottom of the lower pressure section 20. The bottom of lower pressure section 20 is connected by means of conduits 48 and 52 and pump 50 to top of the higher pressure section 12. Substantially formaldehyde-free water vapors, or a mixture of water and formaldehyde vapors, are exhausted from the top of lower pressure section 20.

The bottom fractionating section 12 is provided with the desired number of plates 18, for example, bubble-cap plates as illustrated. The bubble-caps 60, as conventional, are constructed with central vapor chimneys in open communication with the vapor space above the next lower plate, and surmounted by a bonnet which is provided along its lower periphery with a series of vapor-escape slots. Vapor disengaged from the liquid on each plate passes upwardly through the vapor chimneys of the next higher plates and bubbles through the escape slots, traversing the liquid which is carried on each plate and being thoroughly scrubbed free of less volatile components in the process. The liquid feed which enters section 12 through line 52 passes down the column in seriatim from plate to plate, being withdrawn at the proper level by downflow pipes 75 which are provided on each of the plates. To secure enhanced vapor-liquid contacting, it is preferred to maintain a deep liquid seal of about three inches above the top of the vapor escape slots, it being understood, however, that the process of the present invention is not dependent upon deep liquid seals and the resultant plate to plate pressure differential through section 12. On the other hand, deep liquid seals and the attendant plate to plate pressure drop are included within the scope of this invention, and advantage may be had by combining a considerable plate to plate pressure drop with a pressure drop between the sections 12 and 20.

The liquid material arriving at the bottom of section 12 is circulated by pump 21 through line 15 leading into conventional steam calandria 23, where it is heated by passage through tubes 31 surrounded by saturated steam which is introduced through line 27, condensate being withdrawn through line 29. The heated liquid material is then returned to section 12 through line 25. Formaldehyde product of the high 90% to 97% concentration of the paraformaldehyde state is drawn off as a liquid through line 17 which is fitted with a conventional regulating valve 19.

As previously stated, the vapors emerging from section 12 are withdrawn through line 14 which is provided with a constant pressure regulating valve 16 and then pass into the lower part of the lower pressure formaldehyde concentrating section 20. Section 20 is provided with a series of fractionating plates, preferably bubble-cap plates similar in all respects to those which have been hereinbefore described for section 12. Deep liquid seals are preferably also utilized in section 20; however, they are not essential to the operativeness of the present invention since shallow seals may be used with commensurate increase in pressure differential between the two sections.

The vapor effluent from the top of section 20, consisting of water and methanol, with or without formaldehyde vapors, is withdrawn through line 24, a portion of which is enclosed within condenser 26 through which cooling medium is circulated via lines 28 and 30. The resulting condensate flows into collecting chamber 32 from which a portion may be discarded to the sewer through line 38 fitted with a valve 42 and a conventional barometric leg, not shown, whereas the balance may be returned to section 20 as reflux through lines 40 and 46 provided with conventional regulating valve 44. Vacuum pump 34 connected to the top of collecting chamber 32 is provided to maintain any desired vacuum at the top of section 20.

In operation, aqueous solutions of formaldehyde containing any desired concentration of formaldehyde will be fed to the system through suitable supply lines leading to either distillation section, depending on the concentration of the feed. This feed may originate in a formaldehyde producing methanol oxidation and water absorbing unit located conveniently near at hand, or it may be supplied from other sources.

If the feed material is supplied at a concentration substantially below the formaldehyde concentration of the liquid effluent from section 20, it is preferably supplied to section 20 for initial concentration prior to circulation to section 12. If the concentration of formaldehyde in the feed is substantially the same as that of the liquid effluent from section 20, the feed may be introduced to the topmost plate of section 12, together with the liquid withdrawn from the bottom of section 20, while, if the feed is somewhat richer in formaldehyde than the liquid from 20, the feed is preferably separately introduced at some lower plate of section 12 where the formaldehyde concentration of the feed and the liquid on the plate will be approximately identical, in order to maintain the best possible distillation efficiency.

The fractionation of formaldehyde to the concentrated paraformaldehyde state in section 12 is achieved by maintaining such a pressure at the bottom of this section that the material will always be in a boiling state and, at the same time, the boiling temperature will be above the melting point of paraformaldehyde so that the product may be easily withdrawn as a liquid. On the other hand, if too high a pressure is maintained at this point, the concentrated formaldehyde has a tendency to become so highly polymerized at the elevated boiling temperature corresponding to the pressure that it may solidify, preventing its convenient withdrawal as a liquid. For these reasons, we have found it desirable to maintain the pressure at the bottom of section 12 at some level between about 0.5 and 3.0 atmospheres absolute.

The fractionation of formaldehyde in section 20 is preferably carried out to exhaust substantially formaldehyde-free water and methanol as vapors from the top of the column. To achieve this objective, it is necessary to conduct the distillation in section 20 at a sufficiently low pressure so that the separation of the formaldehyde and water will be substantially complete, whereupon the water and the methanol will vaporize off while the formaldehyde will remain in the column as a somewhat more concentrated water solution.

The precise maintenance of the optimum pressure at the bottom of section 12 is achieved by the constant pressure regulating valve 16 located in the line connecting the two sections, while the maintenance of the desired vacuum at the top of section 20, and correspondingly throughout the section 20, is achieved by vacuum pump 34.

Valve 16 is preferably of the automatic type responsive to pressure fluctuations at the bottom of section 12, opening to permit an increased flow of vaporous effluent from section 12 when the pressure at the bottom exceeds a preselected maximum and closing to decrease the vapor flow when the pressure at the bottom of section 12 falls below a preselected minimum value. Valves functioning in this manner are generally well known in the art. A number of commercially available valves are suitable for the purpose contemplated, for example, air diaphragm motor-actuated valves or electrically or hydraulically operated valves. A pressure sensitive element 31 is preferably mounted inside section 12 at a point below the bottom distillation plate. The variations of this element are transmitted by conventional electrical, pneumatic, or hydraulic means 35 to a conventional relaying device 33 which supplies actuating power to the pressure control valve 16, causing the valve to respond accordingly and maintain a substantially constant preselected pressure at the bottom of section 12. Alternatively, the valve 16 may be connected to the top of section 12 to maintain a substantially constant pressure at the top of this section. Although there will be a pressure difference between the top and bottom of section 12, this difference will remain fairly constant and control of the pressure at the top of this section will fairly effectively control the pressure at the bottom thereof.

A substantially constant preselected vacuum is maintained at the top of section 20 by vacuum pump 34 which is provided with a conventional automatic by-pass regulator responsive to pressure variations at the top of this section, the regulator operating to open an air bleed connection and reduce the vacuum drawn by pump 34 when the pressure falls below a minimum preselected level and close the air bleed to increase the vacuum drawn when a preselected pressure level is exceeded.

It will be apparent from the foregoing description that a change in pressure at the bottom of section 12 will initiate a compensating change in the setting of pressure control valve 16 which will operate to restore the preselected pressure condition within 12. If the corrective action of valve 16 causes any deviation in the pressure at the top of section 20 away from the preselected normal level at that point, vacuum pump 34 will immediately respond in correction, and the operation of section 20 will be completely coordinated with that of section 12 at all times.

The following example is given to set forth in detail the pressures, temperatures, and formaldehyde concentration which exist throughout the system of this invention under one set of operating conditions. The percentage compositions cited herein are in terms of percentage by weight.

In this instance, the raw feed was a 50% formaldehyde-water solution which was drawn from a water absorbing unit of a methanol oxidation apparatus. This solution was concentrated in accordance with the process of this invention by feeding it to the top plate of a higher pressure distillation section fitted with fourteen bubble-cap plates on which a uniform deep liquid seal to the extent of about three inches above the bubble-cap slots was maintained. The pre-selected pressure at the bottom of this section was maintained at about 760 mm. Hg, at which pressure the boiling temperature was in the neighborhood of 110° C. to 125° C. Liquid formaldehyde polymer product of the paraformaldehyde composition (90% to 97% formaldehyde) was withdrawn from the bottom of this section.

Under the above-described conditions of operation, the pressure at the top of the fourteen plate section was about 669 mm. Hg, while the temperature at this point was about 97° C. The vapor effluent withdrawn from the top of this section had a formaldehyde concentration of about 39%, the balance being water and methanol.

The vaporous effluent from the higher pressure section was passed to a lower pressure distillation section fitted with thirty-one bubble-cap plates which were operated with a three-inch deep liquid seal in the same manner as has been described for the higher pressure section. A pressure of about 80 mm. Hg was maintained at the top of the lower pressure section, at which point the temperature was about 47° C. The pressure at the bottom of the lower pressure section was about 282 mm. Hg and the temperature was about 83° C. Under these conditions, the vapor which emerged from the top of this section consisted of water and methanol with only traces of formaldehyde while the liquid withdrawn from the bottom had a formeldehyde concentration of about 48.5%. The composition of the liquid effluent was so near to that of the raw feed that the two flows were merged in the common line which supplied feed to the top of the higher pressure section.

The concentration of formaldehyde according to this invention is conducted at relatively low pressures throughout, which has the advantage that substantially no formic acid is formed anywhere in the system and, therefore, corrosion difficulties are minimized and product quality is improved.

It will be understood that the concentration of formaldehyde according to this invention may be carried out in other plate type columns than the bubble-cap type, so long as the proper fractionating effect is secured. It is also possible to adjust the operating pressures at the bottom of the higher pressure distillation section and the top of the lower pressure distillation section within relatively wide limits. Thus, the pressure at the bottom of the higher pressure section may be carried at from about 0.5 to 3.0 atmospheres absolute, while the pressure at the top of the lower pressure section may be varied from nearly absolute vacuum to about 400 mm. Hg absolute, if desired. As above stated, the pressure drop between sections, i. e., between the top of the higher pressure section and the bottom of the lower pressure section should be at least 100 mm. Hg. It is also preferred that the fractionation system of this invention have an over-all pressure differential, i. e., between the top of the lower pressure section and the bottom of the higher pressure section, of at least 300 mm. Hg.

The pressure carried at the top of the second distillation section is determinative of the composition of the vaporous material leaving this section. The lowest pressure at which a formaldehyde-water azeotrope is formed is about 250 mm. Hg absolute. Thus, if the absolute pressure at the top of the second section is carried below about 250 mm. Hg, the vapors discharged from this section will contain only about 1% of formaldehyde and the process of this invention may be used to concentrate aqueous formaldehyde feed material having any composition above this level. If the absolute pressure at the top of the lower pressure section is carried above about 250 mm. Hg but below about 400 mm. Hg, the vapors exhausted from this section will be somewhat richer in formaldehyde, vapor of about 5% formaldehyde content being discharged at the higher pressure level of 400 mm. Hg. Under these higher pressures it will be apparent that the feed which is supplied to the system must be somewhat richer in formaldehyde than the vaporized 5% material separated at the top in order that concentration may be effected, and that the limiting concentration of the feed will be determined in each case by the pressure which is carried at the top of the lower pressure section.

It will be further understood that the process of this invention may be operated to produce exhaust vapors from the lower pressure section which contain appreciable amounts of formaldehyde, if this is desired, while still producing concentrated liquid formaldehyde as the bottom product of the higher pressure section. In this case, the absolute pressure at the top of the lower pressure section could be carried substantially above 400 mm. Hg or the number of plates in the lower pressure section could be reduced. Ordinarily, however, it is preferred to exhaust substantially formaldehyde-free vapors from the lower pressure section because weak solutions of formaldehyde have few uses and operation is simplified if the top effluent can be discharged directly to the sewer without wasting any product.

Reference in the specification and claims to parts, proportions, and percentages, unless othererwise specified, refers to parts, proportions, and percentages by weight.

Since it is obvious that many changes and modifications can be made in the above-described details without departing from the nature and spirit of the invention, it is to be understood that the invention is not to be limited to said details except as set forth in the appended claims.

What is claimed is:

1. The process of concentrating formaldehyde which comprises fractionating an aqueous solution of formaldehyde in a fractionating system having two connected fractionating zones while maintaining a pressure differential of at least 100 mm. Hg between said two zones, said zones so connected that the vapor from the high pressure zone passes into the lower pressure zone near the bottom thereof and the liquid effluent from the lower pressure zone passes into the higher pressure zone near the top thereof, the formaldehyde concentration in the aqueous solution fed to the system being higher than the concentration of formaldehyde in the vapors passing from said system.

2. The process of concentrating formaldehyde which comprises fractionating an aqueous solution of formaldehyde in a fractionating system having two connected fractionating zones while maintaining a pressure differential of at least 100 mm. Hg between said two zones, said zones so connected that the vapor from the high pressure zone passes into the lower pressure zone near the bottom thereof and the liquid effluent from the lower pressure zone passes into the higher pressure zone near the top thereof, the formaldehyde concentration in the aqueous solution fed to the system being higher than the concentration of formaldehyde in the vapors passing from said system, and maintaining a pressure between 0.5 atmospheric pressure and 3.0 atmospheres pressure at the bottom of the fractionating zone having the higher pressure.

3. The process of concentrating formaldehyde which comprises fractionating an aqueous solution of formaldehyde in a fractionating system having two connected fractionating zones while maintaining a pressure differential of at least 100 mm. Hg between said two zones, said zones so connected that the vapor from the high pressure zone passes into the lower pressure zone near the bottom thereof and the liquid effluent from the lower pressure zone passes into the higher pressure zone near the top thereof, the formaldehyde concentration in the aqueous solution fed to the system being higher than the concentration of formaldehyde in the vapors passing from said system, said fractionation being operated at a sub-atmospheric pressure in the lower pressure zone to maintain the concentration of aqueous formaldehyde condensate below 10% formaldehyde, and a withdrawal of liquid in the higher pressure zone at such a rate as to maintain the concentration thereof between 70% and 97% formaldehyde.

4. The process of concentrating formaldehyde which comprises fractionting an aqueous solution of formaldehyde in a fractionating system having two connected fractionating zones while maintaining a pressure differential of at least 100 mm. Hg between said two zones, said zones so connected that the vapor from the high pressure zone passes into the lower pressure zone near the bottom thereof and the liquid effluent from the lower pressure zone passes into the higher pressure zone near the top thereof, the formaldehyde concentration in the aqueous solution fed to the system being higher than the concentration of formaldehyde in the vapors passing from said system, said fractionation being operated at a sub-atmospheric pressure less than 400 mm. Hg in the lower pressure zone to maintain the concentration of aqueous formaldehyde condensate below 5% formaldehyde, and a withdrawal of liquid in the higher pressure zone at such a rate as to maintain the concentration thereof between 70% and 97% formaldehyde.

5. The process of concentrating formaldehyde which comprises fractionating an aqueous solution of formaldehyde in a fractionating system having two connected fractionating zones while maintaining a pressure differential of at least 100 mm. Hg between said two zones and a pressure differential of at least 300 mm. Hg through the entire fractionating system, said zones so connected that the vapor from the higher pressure zone passes into the lower pressure zone near the bottom thereof, and the liquid effluent from the lower pressure zone passes into the higher pressure zone near the top thereof, the formaldehyde concentration in the aqueous solution fed to the system being higher than the concentration of formaldehyde in the vapors passing from said system.

6. The process of concentrating formaldehyde which comprises fractionating an aqueous solution of formaldehyde in a fractionating system having two connected fractionating zones while maintaining a pressure differential of at least 100 mm. Hg between said two zones and a pressure differential of at least 300 mm. Hg through the entire fractionating system, said zones so connected that the vapor from the higher pressure zone passes into the lower pressure zone near the bottom thereof, and the liquid effluent from the lower pressure zone passes into the higher pressure zone near the top thereof, the pressure at the bottom of the higher pressure zone being maintained at between 0.5 atmospheric pressure and 3.0 atmospheres pressure, and the formaldehyde concentration in the aqueous solution fed to the system being higher than the concentration of formaldehyde in the vapors passing from said system.

7. The process of concentrating formaldehyde which comprises fractionating an aqueous solution of formaldehyde in a fractionating system having two connected fractionating zones while maintaining a pressure differential of at least 100 mm. Hg between said two zones and a pressure differential of at least 300 mm. Hg through the entire fractionating system, said zones so connected that the vapor from the higher pressure zone passes into the lower pressure zone near the bottom thereof, and the liquid effluent from the lower pressure zone passes into the higher pressure zone near the top thereof, the pressure at the bottom of the higher pressure zone being maintained at between 0.5 atmospheric pressure and 3.0 atmospheres pressure and in the lower pressure zone below 400 mm. Hg, and the formaldehyde concentration in the aqueous solution fed to the system being higher than the concentration of formaldehyde in the vapors passing from said system.

CYRUS PYLE.
JAMES A. LANE.

REFERENCES CITED

The following references are of record in the file of this patent:

UNITED STATES PATENTS

| Number | Name | Date |
|---|---|---|
| 2,153,526 | Walker | Apr. 4, 1939 |
| 2,241,110 | Bogart et al. | May 6, 1940 |
| 2,256,497 | Reynolds | Sept. 23, 1941 |
| 2,257,780 | Bludworth | Oct. 7, 1941 |
| 2,381,876 | Carlson | Aug. 14, 1945 |